July 13, 1965     R. L. HENRY     3,195,046
SPARK VOLTAGE ANALYZER UTILIZING AMPLITUDE DISCRIMINATION
Filed Feb. 27, 1961
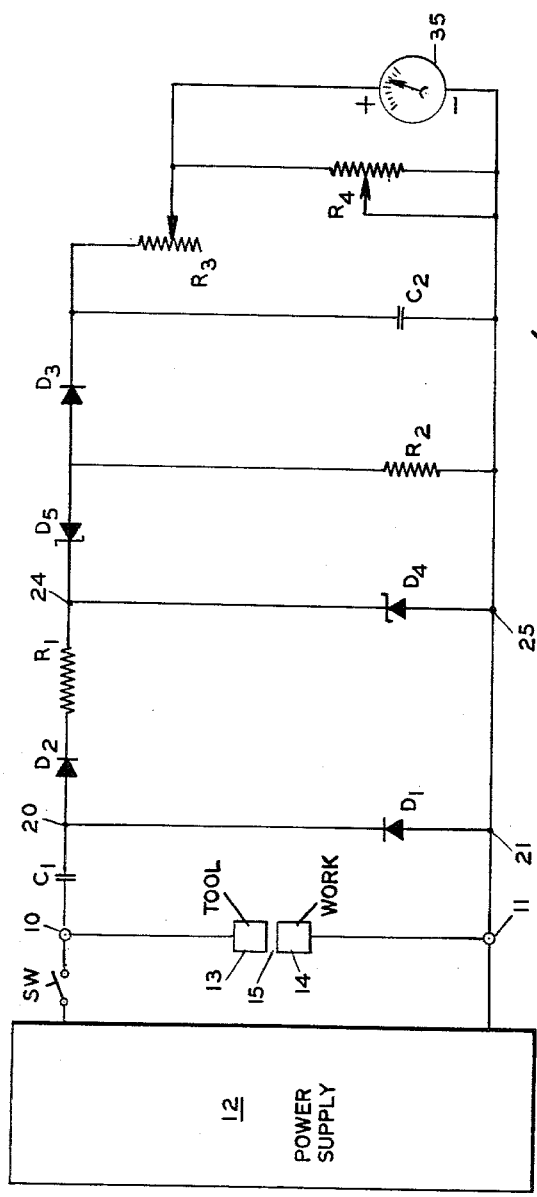
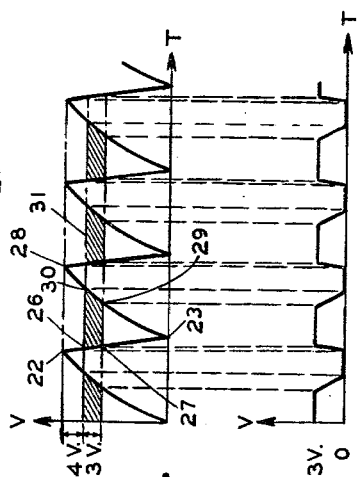
INVENTOR.
ROBERT L. HENRY
BY
ATTORNEYS

United States Patent Office 3,195,046
Patented July 13, 1965

3,195,046
SPARK VOLTAGE ANALYZER UTILIZING
AMPLITUDE DISCRIMINATION
Robert L. Henry, Cincinnati, Ohio, assignor to The
Cincinnati Milling Machine Co., Cincinnati, Ohio, a
corporation of Ohio
Filed Feb. 27, 1961, Ser. No. 91,815
2 Claims. (Cl. 324—72)

This invention relates to a measuring device and, more particularly, to an electrical instrument for indicating how effectively an electro-discharge machine is operating during a cut.

The present day instrumentation of electro-spark machining equipment generally consists of a voltmeter for measuring the voltage across the spark gap and an ammeter for measuring the amount of current flowing through the gap. The indications provided by these meters, however, do not always give a true indication of the effectiveness of the sparking process being performed by the machine. For example, sparking between the tool and the work may be erratic and unstable and yet the voltmeter and ammeter readings may indicate normal voltage and current conditions in the gap so that the operator is unaware that the machine is not performing properly. Thus, the metal removal rate may be well below normal and yet the indicating instruments on the panelboard will not signal the faulty operation of the sparking process. Hence, there is a present need for an instrument which will indicate how well the electro-spark machining process is performing in terms of its optimum efficiency.

It is possible, of course, to observe the regularity and character of the spark discharges by means of an oscilloscope connected across the spark gap. However, while the use of such an instrument is suitable for laboratory testing of spark discharge apparatus, it is not practical for use on a shop machine due to the expensive and fragile nature of the equipment.

Therefore, in order to provide a simple, inexpensive device for accurately indicating the effectiveness of the spark machining process during cutting operations, the instrument hereinafter to be described has been devised. It consists merely of a current operated meter, such as a conventional milliammeter, connected in a novel type of integrating circuit which is effective to measure the area of a portion of the voltage wave across the spark gap. The circuit is so constructed and arranged that the meter responds only to the consistency and regularity of the electrical discharges across the spark gap and is not affected by the magnitude of the voltage or current as measured across or through the gap. The meter also responds to the shape of the wave form of the gap voltage reading higher for a voltage having a rapid rise and fall characteristic than for a voltage having a slow rise and fall. The device is also insensitive to the frequency of the gap voltage over a wide range of frequencies. Hence, normal variations in the sparking frequency of a particular spark discharge circuit will not affect the reading of the performance meter.

It is therefore an object of the present invention to provide a new instrument for indicating whether a spark machining apparatus is operating at maximum efficiency.

Another object of the invention is to provide an indicating instrument for spark discharge machines which is sensitive to the consistency and regularity of the electrical discharges across the spark gap but is not affected by changes in the voltage across the gap.

Another object of the invention is to provide an indicating instrument for spark discharge machines which is sensitive to the shape of the wave form of the gap voltage but not to changes in the sparking frequency of the spark discharge circuit.

Another object of the invention is to provide an instrument which is responsive to the ratio of the "peaks" and "valleys" of the wave form of the voltage across the spark gap of an electro-discharge machine.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 1 is a diagrammatic view in which the performance meter is shown connected to a power supply and a pair of sparking electrodes.

FIG. 2 is a graph showing the voltage across the spark gap.

FIG. 3 is a graph showing the voltage across the resistor $R_2$ of the meter circuit.

In FIG. 1 of the drawings, the performance meter is shown connected at terminals 10 and 11 to a power supply unit 12 and a pair of electrodes 13 and 14 separated by a spark gap 15. An "On-Off" switch SW is shown inserted in one of the leads from the power supply 12 for controlling the energization of the spark gap 15. It will be understood that one of the electrodes represents the tool while the other electrode represents the work in accordance with well known electro-discharge machining practice. It will also be understood by those familiar with the art of electro-discharge machining that the equipment is normally provided with a servofeed mechanism for maintaining a predetermined gap spacing between the tool and the work during the spark machining process.

When the switch SW is opened as shown in FIG. 1, the voltage across the gap 15 is zero. However, when the switch is closed, the voltage across the gap will increase to a point where the gap becomes ionized and a spark discharge will take place in the gap thereby again reducing the potential between the electrodes to zero. This process is repeated continuously and at a rapid rate so long as the switch SW remains closed and so long as the conditions in the gap are correct for sparking.

FIG. 2 shows one possible wave form of the voltage across the spark gap which is essentially a saw tooth wave with the rise time representing the charging of the electrodes and the fall time representing the electrical discharge across the gap. If it be assumed that the terminal 10 is connected to the negative going side of the power supply while the terminal 11 is connected to the positive going side thereof, then each time the voltage difference across the electrodes increases as indicated in FIG. 2, a storage capacitor $C_1$ will be charged through a diode $D_1$. When the voltage across the gap reaches the striking potential, the gap will conduct and, in effect, short circuit the electrodes 13 and 14. The diode $D_1$ will then be reverse biased by the charge on the capacitor and will prevent discharge of the capacitor through the gap. Therefore, capacitor $C_1$ will be charged to a potential substantially equal to the ignition potential of the gap and the blocking action of diode $D_1$ will tend to maintain the charge on the capacitor.

A discharge circuit is provided for the capacitor through a diode $D_2$, a resistor $R_1$, a Zener diode $D_4$, and a second Zener diode $D_5$ and resistor $R_2$ connected in series across diode $D_4$. The Zener diodes are selected to have reverse-bias breakdown voltages which are less than the ignition potential of the spark gap. In addition, the diode $D_5$ has a breakdown voltage which is less than that of diode $D_4$. For purposes of the present description it may be assumed that the diode $D_4$ has a breakdown voltage of 7 volts and that the diode $D_5$ has a breakdown voltage of 4 volts.

During the portion of the charge and discharge cycle when the capacitor $C_1$ is charging through the diode $D_1$, the junctions 20 and 21 (FIG. 1) will be at the same potential so that no current can flow through the discharge circuit. However, when ignition of the gap occurs, for example, at the point 22 on the wave form shown in FIG. 2, the gap will be rendered conducting and the electrodes 13 and 14 will, in effect, be short circuited. Hence, the terminal 10 will be effectively connected to the terminal 11 so that the full potential to which capacitor $C_1$ has been charged will be placed across the junctions 20 and 21. As the voltage across electrodes 13 and 14 drops from point 22 to point 23 (FIG. 2), the effective voltage appearing across the junctions 20 and 21 will increase until, finally at point 23, it will equal the ignition potential of the gap (assuming that the capacitor $C_1$ was fully charged). As the voltage between junctions 20 and 21 thus increases, the voltage between junctions 24 and 25 (FIG. 1) will likewise increase. The voltage across resistor $R_2$ and diode $D_5$ will therefore increase from zero with the entire voltage drop occurring first across diode $D_5$ due to its very high resistance in the reverse direction. After the voltage across the diode has reached 4 volts, which is indicated in FIG. 2 by the point 26 on the curve, diode $D_5$ will break down and start to conduct so that a voltage drop will now appear across resistor $R_2$. When the voltage across junctions 24 and 25 has reached 7 volts, the voltage across resistor $R_2$ will equal 3 volts. At this point, as indicated by the point 27 on the curve in FIG. 2, the diode $D_4$ will break down and start to conduct thereby preventing any further increase in the voltage drop across resistor $R_2$. As the voltage across junctions 20 and 21 continues to increase, the voltage drop across resistor $R_1$ will also increase and the voltage drop across this resistor will be equal to the difference between 7 volts and the ignition potential of the gap.

After the gap has deionized and the voltage across the electrodes 13 and 14 once again begins to rise from the point 23 on the curve in FIG. 2 to the point 28, the voltage across junctions 20 and 21 will decrease as the charge on the electrodes begins to build up. Since the time constant of the resistor-capacitor combination $R_1$, $C_1$ is long compared to the frequency of the discharges across the gap, the capacitor will remain essentially in its fully charged condition and, hence, diode $D_4$ will continue to conduct until the voltage rise across the gap reaches point 29 in FIG. 2. At this point, diode $D_4$ will cease conducting and the voltage drop across resistor $R_2$ will begin to decrease until the point 30 is reached when the drop across the resistor will be reduced to zero. As the voltage across the junctions 24 and 25 continues to decrease from point 30 to point 28, the diode $D_5$ will become nonconducting and the entire voltage drop will appear across this element of the circuit. Once the point 28 is reached, the gap 15 will again ionize and the process will be repeated.

From the foregoing discussion, it will be noted that the voltage drop across resistor $R_2$ occurs during the portion of the charge and discharge cycle represented by the shaded areas 31 in FIG. 2. The wave form of the voltage across this resistor is shown in FIG. 3 and has the general configuration of a square wave voltage which varies from zero to 3 volts. This voltage is applied to an integrator capacitor $C_2$ which is connected across the resistor through a diode $D_3$. The capacitor $C_2$ is provided with a discharge circuit comprised of a potentiometer $R_3$, a milliammeter 35, and a potentiometer $R_4$ connected in shunt across the meter. Hence, the voltage pulses appearing across the resistor $R_2$ will charge the capacitor $C_2$ which, in turn, will discharge through the potentiometer $R_3$ and the meter. The time constant of the resistor-capacitor combination $R_3$, $C_2$ may be adjusted by varying the setting of potentiometer $R_3$ thereby providing means for calibrating the meter for the frequency range desired. The time constant of this circuit should be somewhat shorter than the frequency of sparking and the proper setting of $R_3$ renders the performance meter free from frequency effects within the operating frequency range of the machine. The potentiometer $R_4$ which is connected across the meter serves as a sensitivity adjustment and damping control for the meter. Adjustment of this potentiometer has negligible effect on the time constant of the discharge circuit for capacitor $C_2$.

The scale of meter 35 may, for example, read from 0 to 100 with the upper end of the scale representing the maximum cutting efficiency of the machine. The instrument may be readily be calibrated by connecting terminals 10 and 11 to a sine wave generator set for operation at a frequency equal to the spark discharge frequency of the machine to which the meter is to be applied. The sensitivity control, i.e., potentiometer $R_4$, is then adjusted until the meter reads midscale or, say 50. The frequency range of the meter may be observed by varying the frequency of the sine wave generator to either side of the desired frequency and noting the effect of such variations on the reading of meter 35. Potentiometer $R_3$ may then be adjusted to a position where the normal operating frequency of the machine lies in the middle of the frequency band.

It will be observed from the foregoing description that the spark discharge performance meter is adapted to measure the true cutting efficiency of the electro-discharge machine by looking at a portion of the gap voltage wave form and determining its relative on-off time. Moreover, this specimen of the gap voltage wave form is held to a constant width of three volts and therefore is not affected by changes in the gap voltage. Furthermore, this sample of the gap voltage is only slightly effected by frequency changes within a relatively wide frequency range inasmuch as it is only the ratio of the "valley" width to the "peak" width to which the meter responds within a wide range of frequencies. In the event of a short circuit between the electrodes 13 and 14, the charge on capacitor $C_1$ will not be replenished and the meter reading will drop to zero. On the other hand, if the electrode spacing should become too great for sparking to occur, then there will be no voltage drop across junctions 20 and 21 and none across resistor $R_2$ so that, again, the meter reading will fall to zero. If a condition should develop between the electrodes in which the sparking is sporadic and a number of sparks are missed at frequent intervals, the reading of the meter will drop due to lack of a voltage drop across resistor $R_2$ during these off periods.

In the foregoing description, the invention has been described in connection with one possible form or embodiment thereof and, accordingly, certain specific terms and language have been used in describing the invention. However, it is to be understood that the present disclosure is illustrative rather than restrictive and that changes and modifications may be resorted to without departing from the invention as defined by the claims which follow.

What is claimed is:

1. An instrument for indicating the operating efficiency of an electro-spark discharge apparatus having a pair of electrodes separated by a working gap and a source of electrical energy for producing sparks across the gap, said instrument comprising an integrator capacitor, a charging circuit connected to said electrodes and to said capacitor for applying a predetermined potential across said capacitor on each discharge across the gap to thereby provide said capacitor with an increment of charge after each discharge, said charging circuit including a resistor and a pair of Zener diodes of different breakdown voltages, the resistor and the Zener diode of lower breakdown voltage being connected in series and shunted by the Zener diode of higher breakdown voltage whereby a predetermined potential will be developed across the resistor when current flows through the circuit, means to apply the predetermined potential developed across said resistor to said capacitor to supply an incremental charge thereto, and a discharge circuit for said capacitor including a current operated meter for indicating the average charge on the capacitor and thereby the condition of sparking across the gap.

2. An instrument for indicating the operating efficiency of an electro-spark discharge apparatus having a pair of electrodes separated by a spark gap and a source of electrical energy for supplying charging current to said electrodes, said instrument comprising a storage capacitor, a first circuit for imparting a charge to said capacitor during charging of said electrodes with current from said energy source, a second circuit connected with the capacitor for discharging said capacitor each time the gap is rendered conductive, said second circuit including a voltage dropping resistor for receiving current from said capacitor, means for limiting the voltage drop across said resistor to a predetermined value, said means including a first Zener diode connected in series with said resistor and a second Zener diode connected in shunt across said first diode and said resistor, an integrator capacitor connected across said resistor and adapted to be charged in accordance with the voltage drop across said resistor, and a discharge circuit for said integrator capacitor including a current operated meter for indicating the average level of charge on said capacitor and, thereby, the condition of sparking across the gap.

References Cited by the Examiner
UNITED STATES PATENTS

| 2,926,301 | 2/60 | Westberg et al. | 324—16 |
| 2,929,992 | 3/60 | Carter | 324—70 |
| 2,957,136 | 10/60 | Franz | 324—78 |
| 3,005,155 | 10/61 | Faria | 324—70 |

FOREIGN PATENTS

| 843,152 | 8/60 | Great Britain. |

OTHER REFERENCES

"Electrical Measurement Analysis," Ernest Frank, McGraw-Hill, 1950, pages 57–61.

WALTER L. CARLSON, *Primary Examiner.*

LLOYD McCOLLUM, *Examiner.*